United States Patent
Choi et al.

(10) Patent No.: US 9,618,903 B2
(45) Date of Patent: Apr. 11, 2017

(54) HOLOGRAPHIC IMAGE DISPLAY DEVICE AND METHOD FOR DRIVING THE SAME

(71) Applicant: LG Display Co., Ltd., Seoul (KR)

(72) Inventors: Dong-Jun Choi, Paju-si (KR); Ju-Seong Park, Goyang-si (KR); Woo-Young Choe, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 173 days.

(21) Appl. No.: 14/109,673

(22) Filed: Dec. 17, 2013

(65) Prior Publication Data
US 2014/0293386 A1   Oct. 2, 2014

(30) Foreign Application Priority Data
Mar. 29, 2013  (KR) .................. 10-2013-0034310

(51) Int. Cl.
G03H 1/00 (2006.01)
G03H 1/26 (2006.01)
(Continued)

(52) U.S. Cl.
CPC ......... G03H 1/2294 (2013.01); G03H 1/2286 (2013.01); G03H 2210/30 (2013.01)

(58) Field of Classification Search
CPC ........... H04N 13/0477; H04N 13/0475; H04N 13/0447; H04N 13/0438; H04N 13/0413;
(Continued)

(56) References Cited

U.S. PATENT DOCUMENTS 3,731,986 A * 5/1973 Fergason .................. 349/33
6,049,367 A * 4/2000 Sharp et al. ............. 349/117
(Continued)

FOREIGN PATENT DOCUMENTS

CN  101109890    1/2008
CN  101543066 A  1/2008
(Continued)

OTHER PUBLICATIONS

Pochi Yeh and Claire Gu. 3D displays: toward holographic video displays of 3D images. Chinese Optics Letters. col. 11(1), 010901 (2013). Jan. 10, 2013. doi: 10.3788/COL201311.010901.*
(Continued)

*Primary Examiner* — Bumsuk Won
*Assistant Examiner* — Collin X Beatty
(74) *Attorney, Agent, or Firm* — Fenwick & West LLP

(57) ABSTRACT

Disclosed are a holographic image display device and a method for driving the same which may stabilize luminance of a holographic image and reduce flicker. The holographic image display device includes a laser backlight unit, a surface light converter converting laser light emitted from the laser backlight unit into surface light-type laser light and emitting the surface light-type laser light, a spatial light modulator (SLM) implementing an input holographic interference pattern and projecting a holographic image at a viewing point using the surface light-type laser light, and an optical switching unit located between the laser backlight unit and the SLM and controlling polarization of the laser light. The optical switching unit blocks laser light emitted to the SLM in a blocking mode, and transmits the laser light emitted to the SLM in a transmission mode.

12 Claims, 5 Drawing Sheets

(51) Int. Cl.
  *G03H 1/28* (2006.01)
  *G03H 1/30* (2006.01)
  *G03H 1/22* (2006.01)

(58) Field of Classification Search
  CPC ........... H04N 13/0411; H04N 13/0409; H04N 13/0404; G02B 27/285; G02B 27/283; G02B 27/225; G02B 26/0808; G03H 2225/33; G03H 2001/2655; G03H 2001/2297; G03H 2223/19; G03H 1/2294; G03H 1/02
  USPC ................. 359/32, 463, 9, 1, 15, 23–26, 33, 359/245–256, 276, 277
  See application file for complete search history.

(56) References Cited

U.S. PATENT DOCUMENTS

| | | | |
|---|---|---|---|
| 6,377,295 B1* | 4/2002 | Woodgate et al. | 348/59 |
| 6,831,678 B1* | 12/2004 | Travis | 348/46 |
| 7,535,607 B2 | 5/2009 | Schwerdtner et al. | 359/9 |
| 2006/0050340 A1* | 3/2006 | Schwerdtner et al. | 359/15 |
| 2006/0139710 A1* | 6/2006 | Schwerdtner | 359/9 |
| 2008/0018808 A1 | 1/2008 | Seki | |
| 2009/0244415 A1* | 10/2009 | Ide | 349/33 |
| 2010/0149314 A1* | 6/2010 | Schwerdtner et al. | 348/41 |
| 2010/0194854 A1* | 8/2010 | Kroll et al. | 348/40 |
| 2011/0149359 A1* | 6/2011 | Leister | 359/9 |
| 2011/0205519 A1* | 8/2011 | Kanayamaya | G03F 7/70566 355/71 |
| 2011/0242490 A1 | 10/2011 | Itoh | |
| 2012/0147280 A1* | 6/2012 | Osterman et al. | 349/9 |
| 2012/0327132 A1* | 12/2012 | Tatsuta | H04N 13/0404 345/690 |
| 2013/0293940 A1* | 11/2013 | Kroll et al. | 359/9 |
| 2014/0300695 A1* | 10/2014 | Smalley et al. | 348/40 |
| 2014/0300709 A1* | 10/2014 | Futterer et al. | 348/51 |
| 2015/0124302 A1* | 5/2015 | Leister | 359/9 |

FOREIGN PATENT DOCUMENTS

| | | |
|---|---|---|
| CN | 102073264 A | 9/2009 |
| CN | 102981277 | 3/2013 |
| JP | 2007004041 | 1/2007 |
| TW | 201237571 | 9/2012 |

OTHER PUBLICATIONS

Norbert Leister, Gerald Fütterer, Ralf Haussler, Stephan Reichelt, Hagen Sahm, Alexander Schwerdtner, Armin Schwerdtner and Hagen Stolle. Holographic 3D Displays from SeeReal: Developments, Improvements, Progress. 1179-1182 IMID 2009 Digest.*

Fahri Yaras, Levent Onural. Color Holographic Reconstruction Using Multiple SLMs and LED Illumination. Proceedings of SPIE-IS&T Electronic Imaging, SPIE vol. 7237, 72370O, © 2009 SPIE-IS&T.*

Office Action for Chinese Patent Application No. 201310647775.3, May 17, 2016, 12 Pages.

* cited by examiner

HOLOGRAPHIC IMAGE DISPLAY DEVICE AND METHOD FOR DRIVING THE SAME

CROSS-REFERENCE TO RELATED APPLICATIONS

This application claims the benefit of Korean Patent Application No. 10-2013-0034310, filed on Mar. 29, 2013, which is hereby incorporated by reference as if fully set forth herein.

BACKGROUND OF THE INVENTION

Field of the Invention

The present invention relates to a holographic image display device, and more particularly, to a holographic image display device and a method for driving the same which may stabilize luminance of a holographic image and reduce flicker.

Discussion of the Related Art

Stereoscopic image display devices displaying 3D images with enhanced realism have been applied to various fields, such as medicine, education, gaming, movies, and TV industries. As methods for displaying stereoscopic images, there are stereoscopy, holography, integral imaging, etc. Among these methods, the holography method is an auto-stereoscopic method in which an observer may view a stereoscopic image equal to an actual object using a hologram, and is known as the most ideal method in which an observer may feel a stereoscopic image having an excellent 3D effect without fatigue.

The holography method uses a principle of recording an interference signal acquired through superposition of light reflected by an object (an object wave) and light having coherence (a reference wave) and reproducing the interference signal. Recordation of an interference pattern, formed by joining an object wave, which is formed by scattering of laser light having high coherence through collision with an object, with a reference wave incident in a different direction, on a film is referred to as a hologram. When the object wave and the reference wave are joined, the interference pattern is formed by interference therebetween, and amplitude and phase information of the object are recorded in such an interference pattern. Restoration of the stereoscopic image, recorded as the hologram, into a 3D image by emitting reference light to the interference pattern is referred to as holography.

In a holographic image display device, a computer system generates a holographic interference pattern image corresponding to a stereoscope image and transmits the holographic interference pattern image to a spatial light modulator (SLM), laser light (reference light) emitted from a laser backlight unit is converted into surface light by a surface light converter, and the surface light is emitted to the SLM. The SLM including a transmission type liquid crystal display panel displays a holographic interference pattern and diffracts the emitted light, thus projecting a holographic image at a viewing point.

However, since liquid crystal response time of the liquid crystal display panel used in the SLM is slow, if the laser backlight unit is continuously turned on, light reaches the viewing point even while the liquid crystals are driven and thus, an imperfect image may be generated. In order to prevent such a problem, a blinking technique in which the laser backlight unit is turned off while the liquid crystals are driven each frame (while image data of one frame is applied to the panel) and is then turned on after the liquid crystals have been completely driven (after image data of one frame has been completely applied to the panel) is used. Since the laser backlight unit is turned on only at a point of time when the liquid crystals have been completely driven, such a blinking technique may eliminate an imperfect image and display only a perfect image of one frame. Therefore, the blinking technique is applied for the purpose of relieving eye fatigue and allowing an observer to watch a comfortable image.

However, since the laser backlight unit reaches a saturation state in which each laser light is stabilized only if a designated time has been elapsed after the laser backlight unit has been converted from the off state to the on state, the blinking technique unstably varies luminance of a holographic image.

FIG. 1 is a graph representing luminance variation of specific laser light according to time. From FIG. 1, it may be understood that the laser light is saturated after a designated time from turning-on of a laser backlight unit has been elapsed.

However, since the blinking technique performs time division in which each frame is divided into an off period and an on period, the on period is shorter than a period for which laser light reaches a saturation state and thus, laser light having unstable luminance is used. Thereby, when an observer views a holographic image, eye fatigue of the observer may be caused and a clear image may not be acquired.

SUMMARY OF THE INVENTION

Accordingly, the present invention is directed to a holographic image display device and a method for driving the same that substantially obviate one or more problems due to limitations and disadvantages of the related art.

An object of the present invention is to provide a holographic image display device and a method for driving the same which may stabilize luminance of a holographic image and reduce flicker.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a holographic image display device includes a laser backlight unit emitting laser light, a surface light converter converting the laser light into surface light-type laser light and emitting the surface light-type laser light, a spatial light modulator (SLM) implementing an input holographic interference pattern and projecting a holographic image at a viewing point using the surface light-type laser light, and an optical switching unit located between the laser backlight unit and the SLM and controlling polarization of the laser light, wherein the optical switching unit blocks laser light emitted to the SLM in a blocking mode corresponding to a period for which the SLM performs filling of respective pixels with the holographic interference pattern each frame, and transmits the laser light emitted to the SLM in a transmission mode corresponding to a period after the filling with the holographic interference pattern has been completed each frame.

The optical switching unit may include first and second polarizing plates having polarizing characteristics in which polarization directions thereof are perpendicular to each other, and a liquid crystal cell located between the first and second polarizing plates. Here, the polarization direction of the second polarizing plate located at a light emission part of the optical switching unit may be designed so as to be equal to the polarization direction of the SLM.

In the blocking mode, the liquid crystal cell may maintain a polarizing component of the laser light transmitted by the first polarizing plate so as to be absorbed by the second polarizing plate, and in the transmission mode, the liquid crystal cell may convert the polarizing component of the laser light transmitted by the first polarizing plate into a polarizing component in the same direction as the polarization direction of the second polarizing plate so as to be transmitted by the second polarizing plate.

The laser backlight unit may emit point light-type laser light, and the optical switching unit may be located between the laser backlight unit and the surface light converter, have the same size as the size of the laser backlight unit, and control polarization of the point light-type laser light.

Otherwise, the optical switching unit may be located between the surface light converter and the SLM and control polarization of the surface light-type laser light.

The holographic image display device may further include a controller supplying the holographic interference pattern to the SLM and controlling driving timing of the SLM and the optical switching unit, and the controller may control driving of the optical switching unit in the blocking mode and the transmission mode by synchronizing the optical switching unit with the SLM.

In another aspect of the present invention, a method for driving a holographic image display device includes emitting laser light through a laser backlight unit, converting the laser light into surface light-type laser light and emitting the surface light-type laser light through a surface light converter, implementing an input holographic interference pattern and projecting a holographic image at a viewing point using the surface light-type laser light through a spatial light modulator (SLM), and controlling polarization of the laser light through an optical switching unit located between the laser backlight unit and the SLM, wherein the control of polarization of the laser light includes causing the optical switching unit to block laser light emitted to the SLM in a blocking mode corresponding to a period for which the SLM performs filling of respective pixels with the holographic interference pattern, and causing the optical switching unit to transmit the laser light emitted to the SLM in a transmission mode corresponding to a period after the filling with the holographic interference pattern has been completed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a graph representing luminance variation of a conventional laser backlight unit with progress of time after turning-on;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
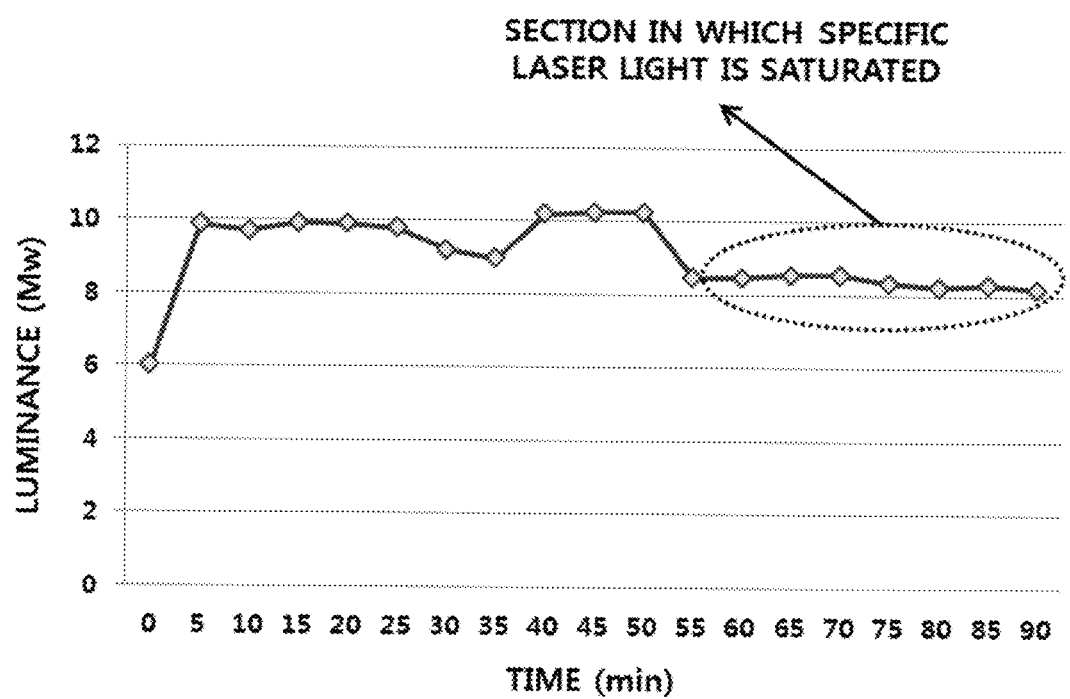
Figure 2:
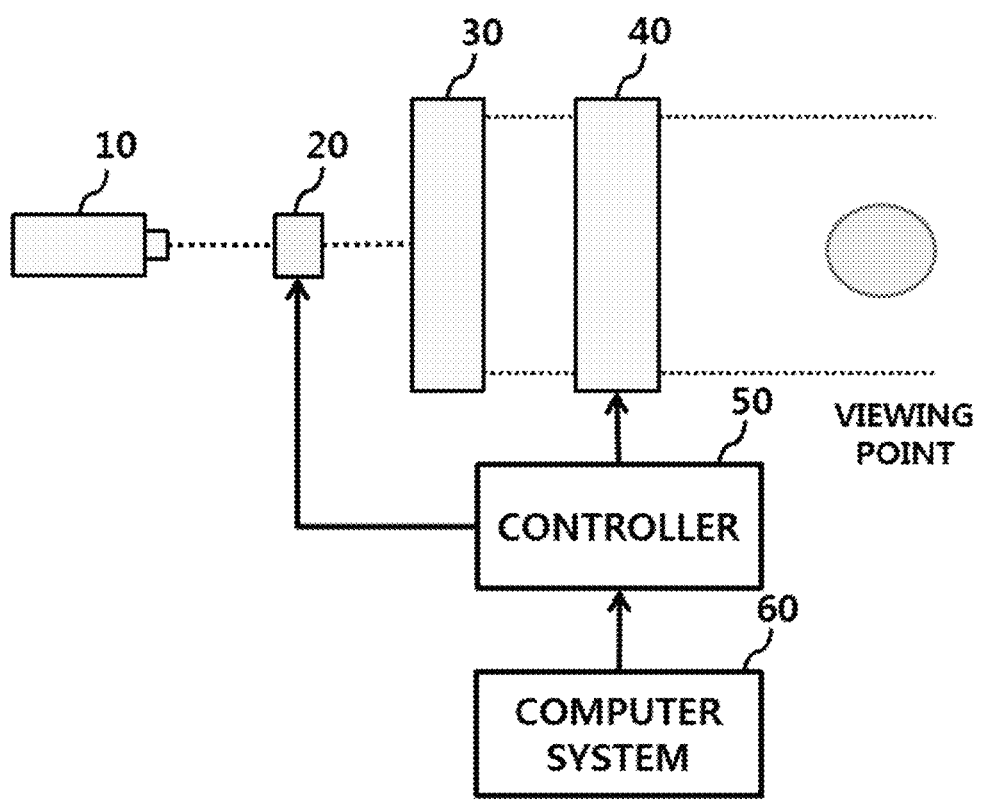
FIG. 2 is a view illustrating the configuration of a holographic image display device in accordance with one embodiment of the present invention.

FIG. 2 is a view illustrating the configuration of a holographic image display device in accordance with one embodiment of the present invention.

The holographic image display device shown in FIG. 2 includes a laser backlight unit 10, an optical switching unit 20, a surface light converter 30, and a spatial light modulator (SLM) 40. Further, the holographic image display device includes a controller 50 controlling the optical switching unit 20 and the SLM 40, and a computer system 60 generating a holographic interference pattern image and supplying the generated holographic interference pattern image.

The laser backlight unit 10 emits laser light having a parallel and straightly moving property. The laser backlight unit 10 is turned on by input power (not shown), and maintains the on state while the holographic image display device is driven.

The optical switching unit 20 blocks or transmits the laser light by controlling polarization of the laser light emitted from the laser backlight unit 10. For this purpose, the optical switching unit 20 includes first and second polarizing plates having polarizing characteristics in which polarization directions thereof are perpendicular to each other, and a liquid crystal cell located between the first and second polarizing plates. The polarization direction of the second polarizing plate located at a light emission part is designed so as to be the same as the polarization direction of the SLM 40. By locating the optical switching unit 20 in front of the laser backlight unit 10 (i.e., between the laser backlight unit 10 and the surface light converter 30), the size of the optical switching unit 20 may be reduced to the size of a point light source (i.e., the laser backlight unit 10).

The liquid crystal cell is formed by bonding a first substrate provided with a first electrode and a second substrate provided with a second electrode using a sealing material under the condition that a liquid crystal layer is interposed between the first and second substrates. In the liquid crystal cell, the liquid crystal layer is driven according to driving voltage applied between the first and second electrodes and polarization of laser light having a specific polarizing component, having transmitted by the first polarizing plate, is controlled, thus causing the laser light to be blocked or transmitted by the second polarizing plate.

The surface light converter 30 converts the laser light, incident upon the surface light converter 30 via the optical switching unit 20, into surface light, and emits the surface light to the overall surface of the SLM 40. The surface light converter 30 includes an extender extending point light (i.e., the laser light) to surface light and uniformly emitting the surface light to the overall surface of the SLM 40, and a plurality of optical elements, such as a lens.

The SLM 40 includes a transmission type liquid crystal display panel having a pixel matrix on which a holographic pattern is formed. The SLM 40 changes intensity and phase of light emitted from the surface light converter 30 by diffracting the light by forming a holographic interference pattern input from the computer system 60 through the controller 50, thus displaying a holographic image at a viewing point.

Figure 3:
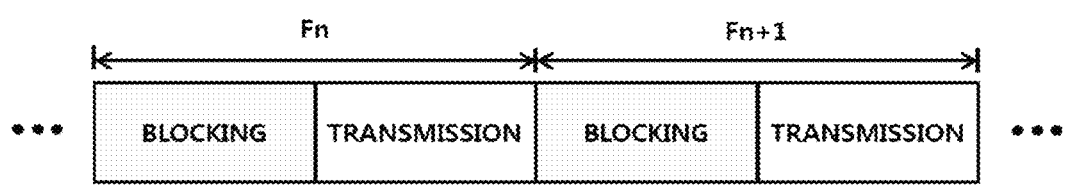
FIG. 3 is a view illustrating a time division driving mode of each frame by a controller shown in FIG. 2.

The controller 50 supplies the holographic interference pattern supplied from the computer system 60 to the SLM 40, and controls driving of the SLM 40 and the optical switching unit 20. The controller 50 performs time division of each of frames Fn, Fn+1 and so forth, into a blocking mode for blocking projection of a holographic image and a transmission mode for projection of a holographic image and thus synchronously controls the SLM 40 and the optical switching unit 20, as exemplarily shown in FIG. 3.

The blocking mode indicates a period for which the SLM 40 fills respective pixels with received holographic interference pattern image data. In such a blocking mode, the controller 50 controls the optical switching unit 20 so as to block laser light emitted from the laser backlight unit 10 and thus, prevents projection of an unstable holographic image at the viewing point due to unfilling of data.

The transmission mode indicates a period after data filling through SLM 40 has been completed. In such a transmission mode, the controller 50 controls the optical switching unit 20 so as to transmit laser emitted from the laser backlight unit 10 and thus, allows an image stably filling the SLM 40 to be projected as a stable holographic image at the viewing point.

Figure 4A:
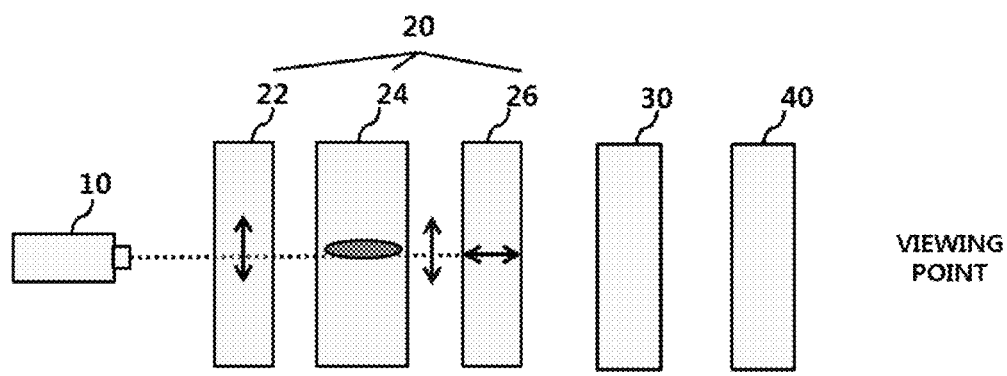
FIGS. 4A and 4B are views illustrating an blocking mode and a transmission mode of the holographic image display device shown in FIG. 2.
Figure 4B:
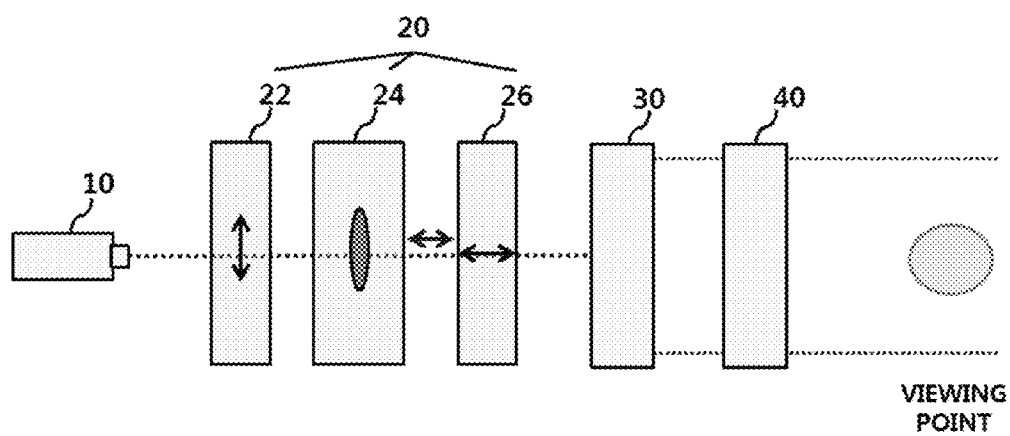

FIGS. 4A and 4B are views illustrating the blocking mode and the transmission mode of the holographic image display device shown in FIG. 2.

For convenience of description, only the optical switching unit 20 is enlarged in FIGS. 4A and 4B. The optical switching unit 20 includes liquid crystal cells 24 located between a first polarizing plate 22 which is a vertically polarizing plate, and a second polarizing plate 26 which is a horizontally polarizing plate. The polarization direction of the second polarizing plate 26 located at the light emission part is designed so as to be the same as the polarization direction of the SLM 40.

In the blocking mode shown in FIG. 4A, as laser light emitted from the laser backlight unit 10 passes through the vertically polarizing plate 22, the laser light has only a vertically polarizing component. In the liquid crystal cells 24, liquid crystal molecules are arranged in the vertical direction the same as the vertically polarizing plate 22 by driving voltage, and the laser light passes through the liquid crystal cells 24 while maintaining the vertically polarizing component. The vertically polarized laser light reaching the horizontally polarizing plate 26 does not pass through the horizontally polarizing plate 26 and is canceled. Thereby, in the blocking mode, laser light is not incident upon the SLM 40 and thus, projection of an unstable image, filling the pixel matrix, at the viewing point may be prevented.

In the transmission mode shown in FIG. 4B, when laser light emitted from the laser backlight unit 10 passes through the vertically polarizing plate 22, the laser light has only a vertically polarizing component. In the liquid crystal cells 24, liquid crystal molecules are arranged in the horizontal direction vertical to the vertically polarizing plate 22 by driving voltage, and as the laser light passes through the liquid crystal cells 24, the vertically polarizing component of the laser light is converted into a horizontally polarizing component. The horizontally polarized laser light passes through the horizontally polarizing plate 26 and is converted into surface light through the surface light converter 30, and the surface light is emitted to the SLM 40. Thereby, in the transmission mode, a stable image completing filling of the pixel matrix is projected as a holographic image at the viewing point by emitted laser light.

Figure 5:
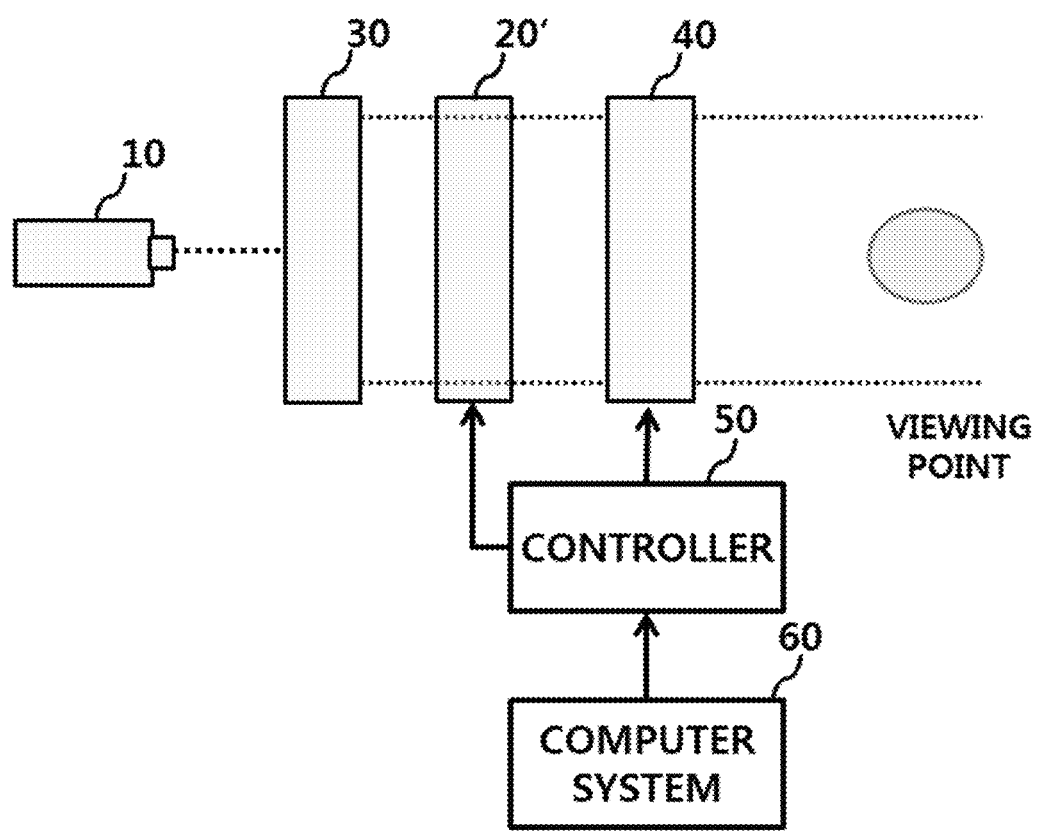
FIG. 5 is a view illustrating the configuration of a holographic image display device in accordance with another embodiment of the present invention.

FIG. 5 is a view illustrating the configuration of a holographic image display device in accordance with another embodiment of the present invention.

By locating the optical switching unit 20 shown in FIG. 2 in front of the laser backlight unit 10 (i.e., between the laser backlight unit 10 and the surface light converter 30), polarization of the overall laser light may be controlled only by the liquid crystal cells having a small size corresponding to the size of the laser backlight unit 10 serving as a light source.

On the other hand, in the holographic image display device in accordance with the embodiment shown in FIG. 5, an optical switching unit 20' may be located between a surface light converter 30 and an SLM 40, and a detailed description of other parts in accordance with this embodiment which are substantially the same as those in the embodiment shown in FIG. 2 will be omitted. The optical switching unit 20' shown in FIG. 5 has a size greater than the size of the optical switching unit 20 shown in FIG. 2, i.e., a size corresponding to the size of the surface light converter 30, and controls polarization of surface laser light. Thereby, the optical switching unit 20' prevents emission of the surface laser light to the SLM 40 in the blocking mode, and emits the surface laser light to the SLM 40 in the transmission mode so that an image displayed on the SLM 40 may be projected as a holographic image at the viewing point.

As apparent from the above description, a holographic image display device in accordance with one embodiment of the present invention selectively blocks laser light progressing towards an SLM by controlling polarization of the laser light using an optical switching unit, thus preventing projection of an unstable holographic image, which is performing data filling, at a viewing point in the blocking mode and projecting a stable holographic image, which has completed data filling, at the viewing point in the transmission mode without on/off of a laser backlight unit.

Thereby, the holographic image display device in accordance with the embodiment of the present invention does not turn the laser backlight unit on/off, differently from the conventional holographic image display device, and may thus stably project a holographic image continuously using luminance stabilized into a saturation state after turning-on of the laser backlight unit without luminance variation. Therefore, the holographic image display device in accordance with the embodiment of the present invention may reduce flicker due to luminance variation of a holographic image and display a natural holographic image.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A holographic image display device comprising:
   a laser backlight unit emitting laser light;
   a surface light converter receiving the laser light over a first area of a first surface of the surface light converter and emitting light over a second area of a second surface of the surface light converter, the second area larger than the first area;
   a spatial light modulator (SLM) comprising a liquid crystal display panel configured to implement an input holographic interference pattern by directly receiving the light emitted from the surface light converter over an entire surface of the SLM facing the surface light converter and projecting a holographic image from a second surface of the SLM to a viewing point; and
   an optical switching unit located between the laser backlight unit and the SLM to control polarization of the laser light, wherein the optical switching unit is configured to:
      block the laser light or the light emitted from the surface light converter in a blocking period of each frame, pixels of the SLM are being filled with the holographic interference pattern in the blocking period; and
      transmit the laser light or the light emitted from the surface light converter in a transmission period of each frame, the transmission period coming after completing of filling of the pixels with the holographic interference pattern and lasting until updating the pixels with another holographic interference pattern of a next frame of each frame.

2. The holographic image display device according to claim 1, wherein the optical switching unit includes:
   first and second polarizing plates having polarization directions that are perpendicular to each other; and
   a liquid crystal cell located between the first and second polarizing plates.

3. The holographic image display device according to claim 2, wherein the polarization direction of the second polarizing plate located at a light emission part of the optical switching unit is same as the polarization direction of the SLM.

4. The holographic image display device according to claim 3, wherein:
   during the blocking period, the liquid crystal cell maintains a polarized component of the laser light transmitted by the first polarizing plate for absorption by the second polarizing plate; and
   during the transmission period, the liquid crystal cell converts a polarized direction of the polarized component of the laser light transmitted by the first polarizing plate to be same as the polarization direction of the second polarizing plate for passing through the second polarizing plate.

5. The holographic image display device according to claim 4, wherein:
   the laser backlight unit emits point light-type laser light; and
   the optical switching unit is located between the laser backlight unit and the surface light converter, the optical switching unit having the same size as the size of the laser backlight unit, and the optical switching unit controlling polarization of the point light-type laser light.

6. The holographic image display device according to claim 4, wherein the optical switching unit is located between the surface light converter and the SLM, and controls polarization of the surface light-type laser light.

7. The holographic image display device according to claim 4, further comprising a controller supplying the holographic interference pattern to the SLM and controlling driving timing of the SLM and the optical switching unit, wherein the controller controls driving of the optical switching unit in the blocking period and the transmission period by synchronizing the optical switching unit with the SLM.

8. A method for driving a holographic image display device comprising:
   emitting laser light through a laser backlight unit;
   receiving the emitted laser light at a first surface of a surface light converter over a first area;
   transmitting light from a second surface of the surface light converter over a second area larger than the first area directly to an entire surface of a spatial light modulator facing the surface light converter;
   implementing an input holographic interference pattern by the spatial light modulator (SLM) comprising a liquid crystal display panel;
   projecting a holographic image at a viewing point by passing the light emitted from the surface light converter through the SLM; and
   controlling polarization of the laser light through an optical switching unit located between the laser backlight unit and the SLM, wherein controlling of polarization of the laser light includes:
      causing the optical switching unit to block the laser light or the light emitted from the surface light converter in a blocking period of each frame, pixels of the SLM are being filled with the holographic interference pattern in the blocking period, and
      causing the optical switching unit to transmit the laser light or the light emitted from the surface light converter in a transmission period of each frame, the transmission period coming after completing of filling of the pixels with the holographic interference pattern and lasting until updating the pixels with another holographic interference pattern of a next frame of each frame.

9. The method according to claim 8, wherein the optical switching unit includes:
   first and second polarizing plates having polarization directions perpendicular to each other; and
   a liquid crystal cell located between the first and second polarizing plates, wherein:
   in the blocking period, the liquid crystal cell maintains a polarized component of the laser light transmitted by the first polarizing plate for absorption by the second polarizing plate; and
   in the transmission period, the liquid crystal cell converts a polarized direction of the polarizing component of the laser light transmitted by the first polarizing plate to be same as the polarization direction of the second polarizing plate for passing through the second polarizing plate.

10. The method according to claim 9, wherein:
    the laser backlight unit emits point light-type laser light; and
    the optical switching unit is located between the laser backlight unit and the surface light converter and controls polarization of the point light-type laser light.

11. The method according to claim 9, wherein the optical switching unit is located between the surface light converter and the SLM and controls polarization of the surface light-type laser light.

12. The method according to claim 9, wherein a controller controls driving of the optical switching unit in the blocking period and the transmission period by synchronizing the optical switching unit with the SLM.

* * * * *